United States Patent
Jayaraman et al.

(10) Patent No.: US 12,028,190 B1
(45) Date of Patent: Jul. 2, 2024

(54) LOOKUP TABLE OPTIMIZATION FOR HIGH SPEED TRANSMIT FEED-FORWARD EQUALIZATION LINK

(71) Applicants: Advanced Micro Devices, Inc., Santa Clara, CA (US); ATI Technologies ULC, Markham (CA)

(72) Inventors: Pradeep Jayaraman, San Jose, CA (US); Karthik Gopalakrishnan, Cupertino, CA (US); Andrew Egli, Burnaby (CA)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 13 days.

(21) Appl. No.: 18/086,960

(22) Filed: Dec. 22, 2022

(51) Int. Cl.
  *H04L 25/03* (2006.01)
  *H04L 25/49* (2006.01)
(52) U.S. Cl.
  CPC .... *H04L 25/03038* (2013.01); *H04L 25/4917* (2013.01); *H04L 2025/03471* (2013.01)
(58) Field of Classification Search
  CPC ........... H04L 25/03038; H04L 25/4917; H04L 2025/03471
  See application file for complete search history.

(56) References Cited

U.S. PATENT DOCUMENTS

| | | | |
|---|---|---|---|
| 10,911,272 B2 * | 2/2021 | Palusa | H04L 27/01 |
| 11,005,690 B1 * | 5/2021 | Cartina | H04L 25/03859 |
| 2021/0126764 A1 * | 4/2021 | Beukema | H04L 7/0008 |
| 2023/0370242 A1 * | 11/2023 | Tan | H04L 7/0058 |

* cited by examiner

*Primary Examiner* — Dac V Ha
(74) *Attorney, Agent, or Firm* — Polansky & Associates, P.L.L.C.; Paul J. Polansky; Nathan H. Calvert (57) ABSTRACT

A driver circuit includes a feed-forward equalization (FFE) circuit. The FFE circuit receives a plurality of pulse-amplitude modulation (PAM) symbol values to be transmitted at one of multiple PAM levels. The FFE circuit includes a first partial lookup table, one or more additional partial lookup tables, and an adder circuit. The first partial lookup table contains partial finite impulse-response (FIR) values and indexed based on a current PAM symbol value, a precursor PAM symbol value, and a postcursor PAM symbol value. The one or more additional partial lookup tables each contain partial FIR values and indexed based on a respective additional one or more of the PAM symbol values. The adder circuit adds results of lookups from the first partial lookup table and the additional partial lookup tables to produce an output value.

20 Claims, 6 Drawing Sheets

LOOKUP TABLE OPTIMIZATION FOR HIGH SPEED TRANSMIT FEED-FORWARD EQUALIZATION LINK

BACKGROUND

Modern dynamic random-access memory (DRAM) provides high memory bandwidth by increasing the speed of data transmission on the bus connecting the DRAM and one or more data processors, such as graphics processing units (GPUs), central processing units (CPUs), and the like. In one example, graphics double data rate (GDDR) memory has pushed the boundaries of data transmission rates to accommodate the high bandwidth needed for graphics applications. In order to ensure the correct reception of data, modern GDDR memories and memory physical layer circuits (PHYs) employ feed-forward equalization (FFE) when a signal is transmitted.

With FFE, a transmitted signal pulse is pre-distorted in order to compensate for distortion on the transmission channel. Decision feedback equalization (DFE) may also be used at the receive side to further compensate for distortion. FFE is typically performed with a digital circuit arranged as a finite impulse response (FIR) filter. In such a filter, a number of outgoing signal samples are fed to the filtering circuit, which produces an output value for a current signal sample by multiplying each signal by a sample weight or filter "tap" weight, and adding the results together. This has the effect of pre-distorting or shaping the outgoing signal over several bit or symbol periods in order to invert the channel distortion or inter-symbol interference (ISI)

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF ILLUSTRATIVE EMBODIMENTS

A driver circuit includes a digital-to-analog converter (DAC) and a feed-forward equalization (FFE) circuit. The FFE circuit receives a plurality of pulse-amplitude modulation (PAM) symbol values to be transmitted at one of multiple PAM levels. The FFE circuit includes a first partial lookup table, one or more additional partial lookup tables, and an adder circuit. The first partial lookup table contains partial finite impulse-response (FIR) values and indexed based on a current PAM symbol value, a precursor PAM symbol value, and a postcursor PAM symbol value. The one or more additional partial lookup tables each contain partial FIR values and indexed based on a respective additional one or more of the PAM symbol values. The adder circuit adds results of lookups from the first partial lookup table and the additional partial lookup tables to produce a value fed to the DAC.

A method of producing a PAM signal includes receiving a plurality of PAM symbol values to be transmitted at one of multiple PAM levels. Based on a current PAM symbol value, a precursor PAM symbol value, and a postcursor PAM symbol value of the plurality PAM symbol values, the method includes looking up a partial FIR value in a first partial lookup table. Based on one or more additional PAM symbol values of the plurality of PAM symbol values, the method includes looking up one or more additional partial FIR values in one or more additional partial lookup tables. Results of lookups from the first partial lookup table and the additional partial lookup tables are added to produce a feed-forward equalized value, and the feed-forward equalized value is converted to an analog voltage with a digital-to-analog converter.

A data processing system comprising includes a data processor embodied on an integrated circuit (IC). A physical layer circuit (PHY) embodied in the IC and includes at least one driver circuit for transmitting accesses generated by the data processor over a communication link. The at least one driver includes a DAC and a FFE circuit for receiving a plurality of PAM symbol values to be transmitted at one of multiple PAM levels. The FFE circuit includes a first partial lookup table, one or more additional partial lookup tables, and an adder circuit. The first partial lookup table contains partial FIR values and indexed based on a current PAM symbol value, a precursor PAM symbol value, and a postcursor PAM symbol value. The one or more additional partial lookup tables each contain partial FIR values and indexed based on a respective additional one or more of the PAM symbol values. The adder circuit adds results of lookups from the first partial lookup table and the additional partial lookup tables to produce a value fed to the DAC.

Figure 1:
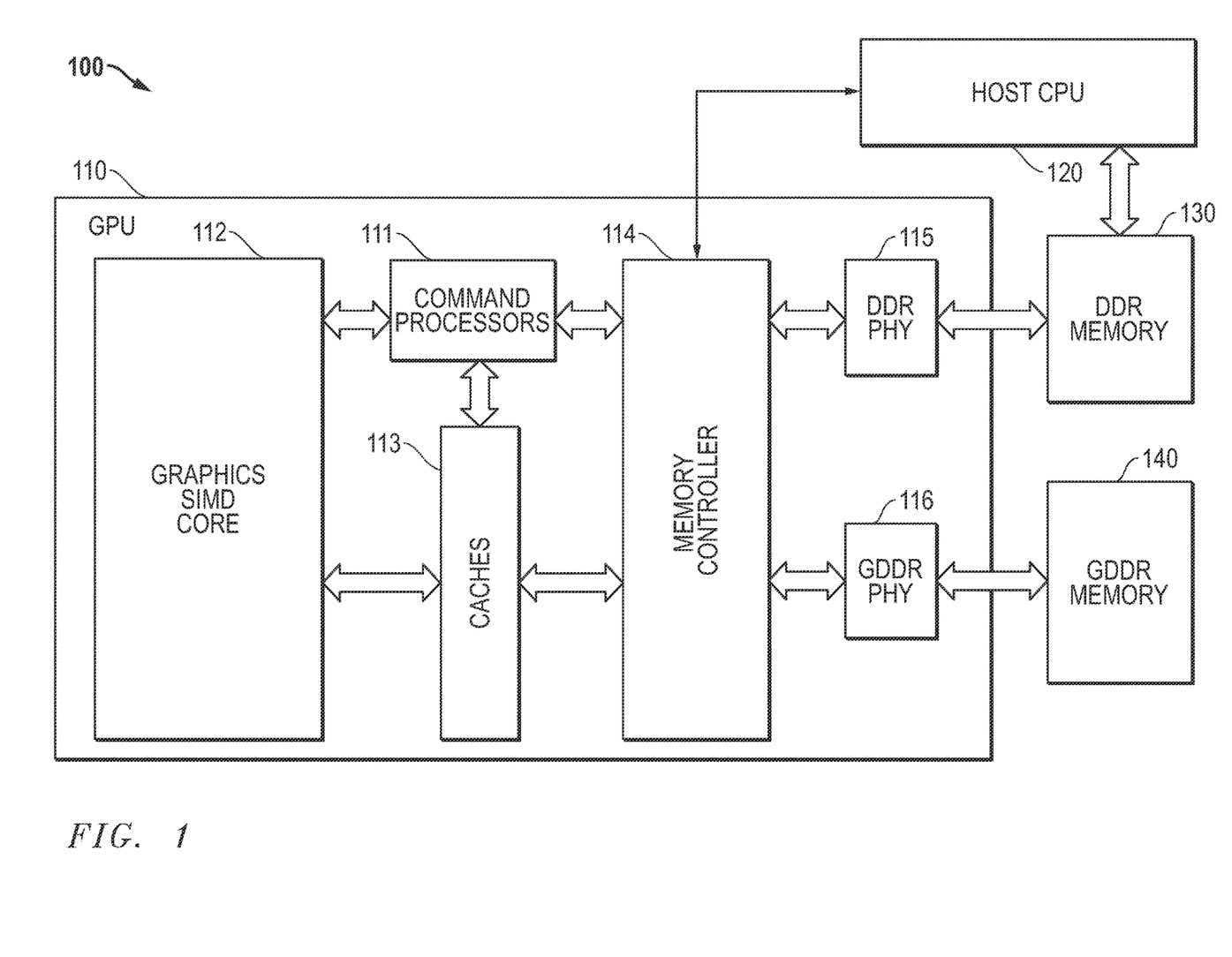
FIG. 1 illustrates in block diagram form a data processing system according to some embodiments.

FIG. 1 illustrates in block diagram for a data processing system 100 according to some embodiments. Data processing system 100 includes generally a data processor in the form of a graphics processing unit (GPU) 110, a host central processing unit (CPU) 120, a double data rate (DDR) memory 130, and a graphics DDR (GDDR) memory 140.

GPU 110 is a discrete graphics processor that has extremely high performance for optimized graphics processing, rendering, and display, but requires a high memory bandwidth for performing these tasks. GPU 110 includes generally a set of command processors 111, a graphics single instruction, multiple data (SIMD) core 112, a set of caches 113, a memory controller 114, a DDR physical interface circuit (PHY) 115, and a GDDR PHY 116.

Command processors 111 are used to interpret high-level graphics instructions such as those specified in the OpenGL programming language. Command processors 111 have a bidirectional connection to memory controller 114 for receiving the high-level graphics instructions, a bidirectional connection to caches 113, and a bidirectional connection to graphics SIMD core 112. In response to receiving the high-level instructions, command processors 111 issue SIMD instructions for rendering, geometric processing, shading, and rasterizing of data, such as frame data, using caches 113 as temporary storage. In response to the graphics instructions, graphics SIMD core 112 executes the low-level instructions on a large data set in a massively parallel fashion. Command processors 111 use caches 113 for temporary storage of input data and output (e.g., rendered and rasterized) data. Caches 113 also have a bidirectional connection to graphics SIMD core 112, and a bidirectional connection to memory controller 114.

Memory controller 114 has a first upstream port connected to command processors 111, a second upstream port connected to caches 113, a first downstream bidirectional port, and a second downstream bidirectional port. As used herein, "upstream" ports are on a side of a circuit toward a data processor and away from a memory, and "downstream" ports are on a side if the circuit away from the data processor and toward a memory. Memory controller 114 controls the timing and sequencing of data transfers to and from DDR memory 130 and GDDR memory 140. DDR and GDDR memory support asymmetric accesses, that is, accesses to open pages in the memory are faster than accesses to closed pages. Memory controller 114 stores memory access commands and processes them out-of-order for efficiency by, e.g., favoring accesses to open pages, disfavoring frequent bus turnarounds from write to read and vice versa, while observing certain quality-of-service objectives.

DDR PHY 115 has an upstream port connected to the first downstream port of memory controller 114, and a downstream port bidirectionally connected to DDR memory 130. DDR PHY 115 meets all specified timing parameters of the implemented version or versions of DDR memory 130, such as DDR version five (DDR5), and performs training operations at the direction of memory controller 114. Likewise, GDDR PHY 116 has an upstream port connected to the second downstream port of memory controller 114, and a downstream port bidirectionally connected to GDDR memory 140. GDDR PHY 116 meets all specified timing parameters of the implemented version of GDDR memory 140, such as GDDR version seven (GDDR7), and performs training operations at the direction of memory controller 114, including initial training of the various data and command lanes of GDDR PHY 116, and retraining during operation.

In operation, data processing system can be used as a graphics card or accelerator because of the high bandwidth graphics processing performed by graphics SIMD core 112. Host CPU 120, running an operating system or an application program, sends graphics processing commands to GPU 110 through DDR memory 130, which serves as a unified memory for GPU 110 and host CPU 120. It may send the commands using, for example, as OpenGL commands, or through any other host CPU to GPU interface. OpenGL was developed by the Khronos Group, and is a cross-language, cross-platform application programming interface for rendering 2D and 3D vector graphics. Host CPU 120 uses an application programming interface (API) to interact with GPU 110 to provide hardware-accelerated rendering.

Data processing system 100 uses two types of memory. The first type of memory is DDR memory 130, and is accessible by both GPU 110 and host CPU 120. As part of the high performance of graphics SIMD core 112, GPU 110 uses a high-speed graphics double data rate (GDDR) memory. For example, the new graphics double data rate, version seven (GDDR7) memory will be able to achieve very high link speeds and 24-40 gigabits per second (Gbps) per-pin bandwidth. Because of the high bandwidth, GDDR7 is suitable for very high-performance graphics operations.

Figure 2:
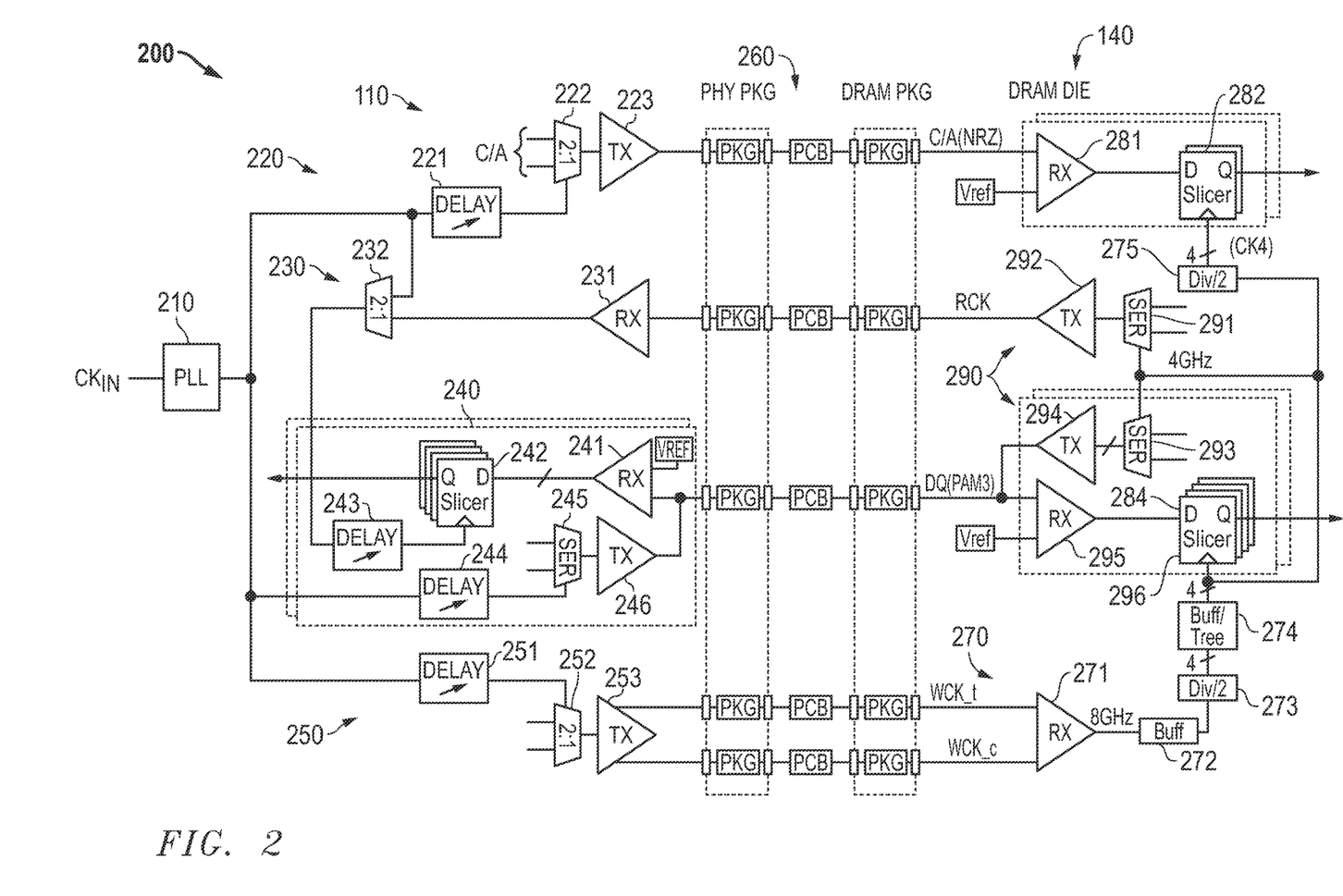
FIG. 2 illustrates in block diagram form a GDDR PHY-DRAM link of the data processing system of FIG. 1 according to some embodiments.

FIG. 2 illustrates in block diagram form a GDDR PHY-DRAM link 200 of data processing system 100 of FIG. 1 according to some embodiments. GDDR PHY-DRAM link 200 includes portions of GPU 110 and GDDR memory 140 that communicate over a physical interface 260.

GPU 110 includes a phase locked loop (PLL) 210, a command and address ("C/A") circuit 220, a read clock circuit 230, a data circuit 240, and a write clock circuit 250. These circuits form part of GDDR PHY 118 of GPU 110.

PLL 210 operates as a reference clock generation circuit and has an input for receiving an input clock signal labelled "$CK_{IN}$", and an output.

C/A circuit 220 includes a delay element 221, a selector 222, and a transmit buffer 223 labelled "TX". Delay element 221 has an input connected to the output of PLL 210, and an output, and has a variable delay controlled by an input, not specifically shown in FIG. 2. The variable delay is determined at startup by a calibration controller and adjusted during operation by a compensation circuit. Selector 222 has a first input for receiving a first command/address value, a second input for receiving a second command/address value, and a control input connected to the output of delay element 221. Transmitter 223 has an input connected to the output of selector 222, and an output connected to a corresponding integrated circuit terminal for providing a command/address signal labelled "C/A" thereto. Note that C/A circuit 220 includes a set of individual buffers for each signal in the C/A signal group that are constructed the same as the representative selector 222 and buffer 223 shown in FIG. 2, but only a representative C/A circuit 220 is shown.

Read clock circuit 230 include a receive buffer 231 labelled "RX", and a selector 232. Receive buffer 231 has an input connected to a corresponding integrated circuit terminal for receiving a signal labelled "RCK", and an output. Receive clock selector 232 has a first input for connected to the output of PLL 210, a second input connected to the output of receive buffer 231, an output, and a control input for receiving a mode signal, not shown in FIG. 2.

Data circuit 240 includes a receive buffer 241, a latch 242, delay elements 243 and 244, a serializer 245, and a transmit buffer 246. Receive buffer 241 has a first input connected to an integrated circuit terminal that receives a data signal labelled generically as "DQ", a second input for receiving a reference voltage labelled "$V_{REF}$", and an output. Latch 242 is a D-type latch having an input labelled "D" connected to the output of receive buffer 241, a clock input, and an output labelled "Q" for providing an output data signal. The interface between GDDR PHY 118 and GDDR memory 140 implements a three-level, pulse amplitude modulation data signaling system known as "PAM-3", which encodes data bits into one of three nominal voltage levels. In other embodiments, other PAM schemes are employed, such as PAM-4, for example. Receive buffer 241 discriminates which of the three levels is indicated by the input voltage, and outputs two data bits to represent the state in response.

For example, receive buffer 241 could generate two slicing levels based on $V_{REF}$ defining three ranges of voltages, and use two comparators to determine which range the received data signal falls in. Data circuit 240 includes latches which latch the data bits and is replicated for each bit position. Delay element 243 has an input connected to the output of selector 232, and an output connected to the clock input of latch 242. Delay element 244 has an input connected to the output of PLL 210, and an output. Serializer 245 has inputs for receiving a first data value of a given bit position and a second data value of the given bit position, the first and second data values corresponding to sequential cycles of a burst, a control input connected to the output of delay element 244, and an output connected to the corresponding DR terminal. Each data byte of the data bus has a set of data circuits like data circuit 240 for each bit of the byte. This replication allows different data bytes that have different routing on the printed circuit board to have different delay values.

Write clock circuit 250 includes a delay element 251, a selector 252, and a transmit buffer 253. Delay element 251 has an input connected to the output of PLL 210, and an output. Selector 252 has a first input for receiving a first clock state signal, a second input for receiving a second clock voltage, a control input connected to the output of delay element 251, and an output. Transmit buffer 253 has an input connected to the output of selector 252, and an output a first output connected to a corresponding integrated circuit terminal for providing a true write clock signal labelled "WCK_t" thereto, and a second output connected to a corresponding integrated circuit terminal for providing a complement write clock signal labelled "WCK_c" thereto.

GDDR memory 140 includes generally a write clock receiver 270, a command/address receiver 280, and a data path transceiver 290. Write clock receiver 270 includes a receive buffer 271, a buffer 272, a divider 273, a buffer/tree 274, and a divider 275. Receive buffer 271 has a first input connected to an integrated circuit terminal of GDDR memory 140 that receives the WCK_t signal, a second input connected to an integrated circuit terminal of GDDR memory 140 that receives the WCK_c signal, and an output. In the example shown in FIG. 2, the output of receive buffer 271 is clock signal having a nominal frequency of 8 GHz. Buffer 272 has an input connected to the output of receive buffer 271, and an output. Divider 273 has an input connected the output of buffer 272, and an output for providing a divided clock having a nominal frequency of 4 GHz. Divider 275 has an input for connected to the output of buffer/tree 274, and an output for providing a clock signal labelled "CK4" having a nominal frequency of 2 GHz.

Command/address receiver 280 includes a receive buffer 281 and a slicer 282. Receive buffer 281 has a first input connected to a corresponding integrated circuit terminal of GDDR memory 140 that receives the C/A signal, a second input for receiving $V_{REF}$, and an output. The C/A input signal is received as a normal binary signal having two logic states levels and is considered a non-return-to-zero (NRZ) signal encoding. Slicer 282 has a set of two data latches each having a D input connected to the output of receive buffer 281, a clock input for receiving a corresponding one of the output of divider 275, and a Q output for providing a corresponding C/A signal.

Data path transceiver 290 includes a serializer 291, a transmitter 292, a serializer 293, a transmitter 294, a receive buffer 295, and a slicer 296. Serializer 291 has an input for receiving a first read clock level, a second input for receiving a second read clock level, a select input connected to the output of buffer/tree 274, and an output. Transmitter 292 has an input connected to the output of serializer 293, and an output connected to the RCK terminal of GDDR memory 140. Serializer 293 has an input for receiving a first read data value, a second input for receiving a second data value, a select input connected to the output of buffer/tree 274, and an output connected to the DQ terminal of GDDR memory 140. Transmitter 294 has an input connected to the output of serializer 293, and an output connected to the corresponding DQ terminal of GDDR memory 140. Receive buffer 295 has a first input connected to the corresponding DQ terminal of GDDR memory 140, a second input for receiving the $V_{REF}$ value, and an output. Slicer 296 has a set of four data latches each having a D input connected to the output of receive buffer 295, a clock input connected to the output of buffer/tree 274, and a Q output for providing a corresponding DQ signal.

Physical interface 260 includes a set of physical connections that are routed between a bond pad of the GPU 110 die, through a package impedance to a package terminal, through a trace on a printed circuit board, to a package terminal of GDDR memory 140, through a package impedance, and to a bond pad of the GDDR memory 140 die.

The WCK clock signal exhibits variations in its periodic signal known as jitter. Such random variations are caused by power supply noise on the WCK's PLL, and other random and deterministic factors. The total jitter along any particular clocking path, such as, for example, the paths to the CA and DQ buffers, is known as accumulated jitter. Generally, the DRAM memory has specifications limiting accumulated jitter and n-cycle accumulated jitter, that is the accumulated jitter measured over a number of unit intervals (UIs) of WCK. Transmitters in the portions of GPU 110 and GDDR memory 140 shown in FIG. 2 implement transmitters with Feed Forward Equalizers (FFEs).

Figure 3:
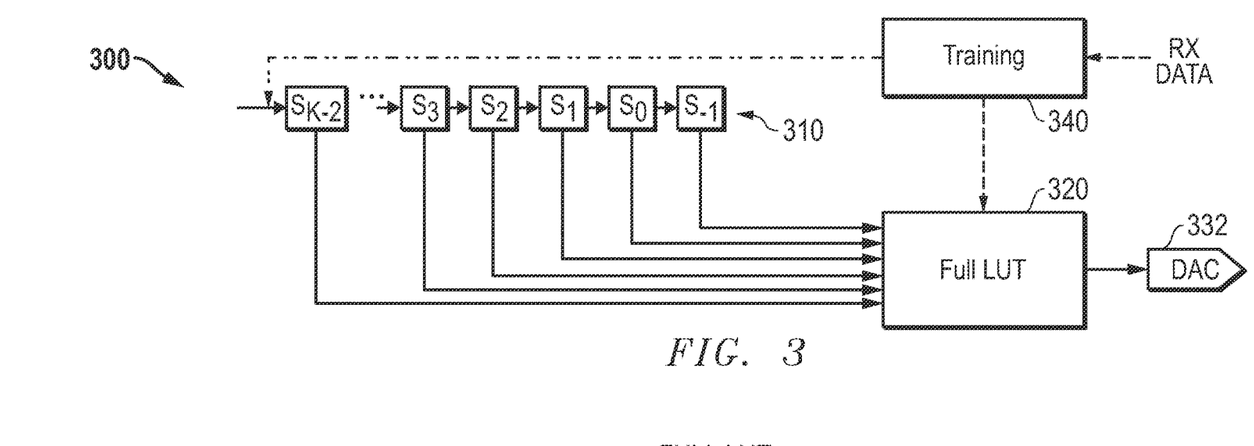
FIG. 3 illustrates in block diagram form a transmit buffer or driver 300 according to some embodiments.

FIG. 3 illustrates in block diagram form a transmit buffer or driver 300 according to some embodiments. Driver 300 is suitable for use as a multi-level PAM driver for a communication link on an integrated circuit, for example in a PHY such as that shown in FIG. 2. Driver 300 includes a feed-forward equalization (FFE) circuit including a symbol buffer 310 and a full lookup table (LUT) 320. Driver 300 also includes a digital-to-analog converter (DAC) 332 and a training control circuit 340. Generally, the FFE circuit receives a plurality of pulse-amplitude modulation (PAM) symbol values to be transmitted at one of three or more PAM levels for PAM3 or higher implementations, or two PAM levels for a non-return to zero (NRZ) PAM2 implementation, and applies a feed-forward equalization filter to produce equalized values to be converted by DAC 332 for transmission. To apply feed-forward equalization, a finite impulse-response (FIR) filter function is implemented with a lookup table structure rather than a filter built with delay lines and tap multipliers as in conventional FIR filter circuits.

Symbol buffer 310 has an input receiving a series of symbol values, and a series of buffer entries labeled "$S_{K-2}$" ... "$S_3$", "$S_2$", "$S_1$", "$S_0$", and "$S_{-1}$", which also refer to the symbol values held therein. Symbol buffer 310 is implemented as a shift register with each buffer entry including an output connected to the next buffer entry and shifted along the buffer at the symbol frequency. Symbol $S_0$ represents the current symbol being processed by the FFE circuit, symbol S-1 represents a first precursor symbol (which was previously $S_0$), symbol $S_1$ represents a first postcursor symbol (which will be $S_0$ in the next symbol cycle), and so on, with "K" representing the size of the filter. In any particular implementation, more or fewer precursor symbols and post-cursor symbols may be used.

Full LUT 320 is used to provide FIR values for the FFE process. Full LUT 320 has a separate input connected to each buffer entry $S_{-1}$, $S_0$, $S_1$, through $S_{K-2}$, and an output connected to DAC 332. Full LUT 320 contains FIR values and is indexed based on the current PAM symbol values, as further described below with respect to FIG. 4.

Training control circuit 340 is operable to train tap weights for full LUT 320. Training control circuit 340 has an input for receiving data back from a receiver during a training mode, labeled "RX DATA", an output for feeding data to the input of symbol buffer 310 during a training mode, and connection to the full LUT 320 for adjusting weights during a training mode.

Figure 4:
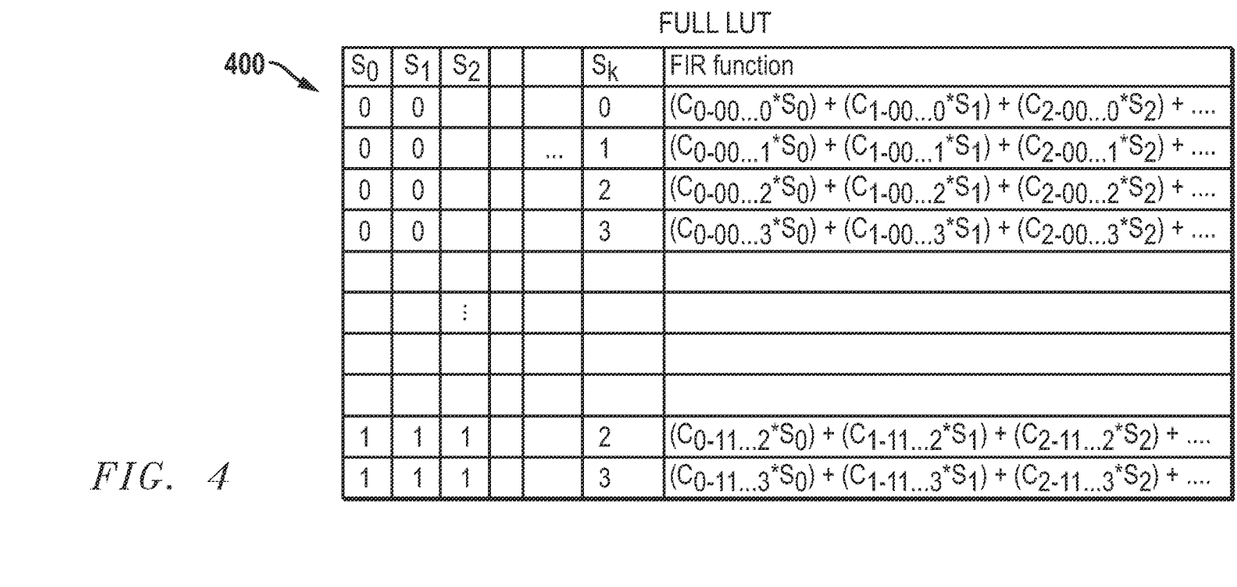
FIG. 4 illustrates a portion of a lookup table for implementing an FFE function of a full LUT according to some embodiments.

FIG. 4 illustrates a portion of a lookup table 400 for implementing an FFE function of a full LUT according to some embodiments. In general, a known lookup table-based FFE provides an FIR function as shown in Equation 1:

$$S_0' = (c_0 * S_0) + (c_1 * S_1) + (c_2 * S_2) \quad (1)$$

However, such a function treats the FFE process as linear, when in fact the feedforward compensation functions better if it is non-linear, because the coefficients of the transfer function are adapting to a transmission path that has a non-linear response depending on prior PAM symbol values transmitted. Therefore, a flat lookup table such as Full LUT 320 is employed in some embodiments to implement a non-linear transfer function in which the coefficients $c_0$, $c_1$, $c_2$, etc., can be different for each combination of symbol values $S_0$, $S_1$, $S_2$, etc. Such an arrangement provides a separate FFE function for every combination of $S_0$, $S_1$, $S_2$, etc. The function implemented by such a table is given in Equation 2:

$$S_0' = (C_{0-xy\ldots z} * S_0) + (C_{1-xy\ldots z} * S_1) + (C_{2-xy\ldots z} * S_2) + (C_{K-xy\ldots z} * S_{K-1}) \quad (2)$$

where $c_{0-xy\ldots z}$, $c_{1-xy\ldots z}$, $c_{2-xy\ldots z}$, etc. are provided based on the combination of symbol values for all input symbols, and where $S_0$, $S_1$, $S_2$, ., represent the sample values $S_{K-2}$ through $S_0$, and $S_{-1}$, simply renumbered as zero through K-1.

Table 400 illustrates such a full lookup table implementation, for example, as can be seen in the second depicted row, which differs from the first in that $S_K$ has a value of "1" instead of "0", the term $(c_{0-oo\ldots 1} * S_0)$ provides a different weight for $S_0$ than the term above it in the first row. In this example, a PAM4 scheme is used such that each S can take on four possible values labeled "0", "1", "2", and "3". As can be understood, other implementations can use a full, non-linear lookup table similarly with other PAM schemes such as PAM2, PAM3, PAM6, etc.

While such a scheme allows implementation of a non-linear FFE function, it results in a large lookup table and therefore can be improved further as discussed below. While in this embodiment, the coefficients are adjusted based on all the symbol values, the present inventors have found that the values of the current PAM symbol $S_0$, the precursor PAM symbol value S-1, and the postcursor PAM symbol value $S_1$, actually have the largest non-linear effects, with other symbol values having a much smaller effect. Therefore, a group of partial lookup tables such as that depicted in FIG. 9 may be used to reduce the total memory required to hold the tables. Various other forms of reduced lookup tables may also be used in different embodiments.

Figure 5:
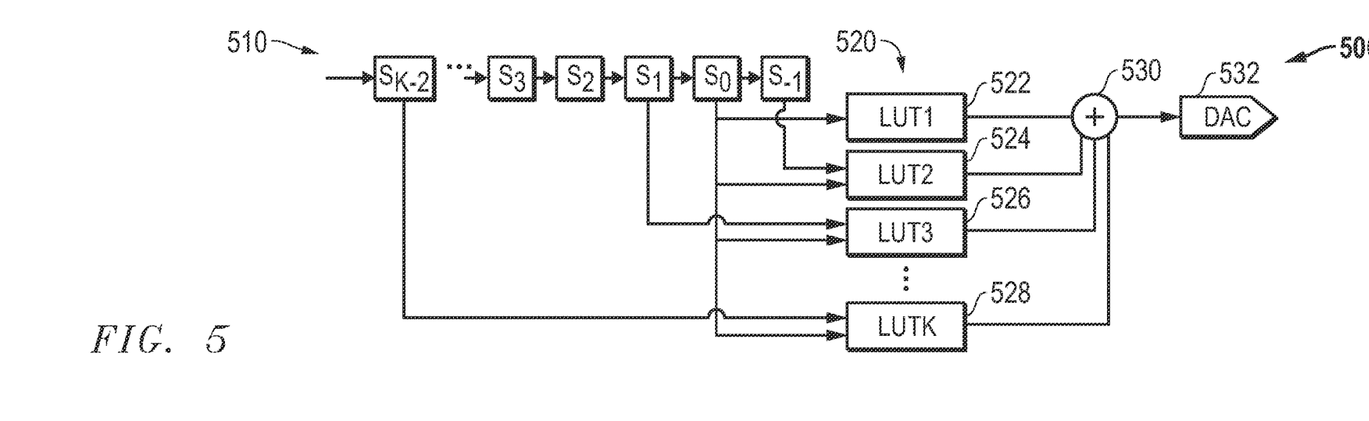
FIG. 5 illustrates in block diagram form a transmit buffer or driver including FFE implemented with a reduced lookup table according to some embodiments.

FIG. 5 illustrates in block diagram form a transmit buffer or driver 500 including FFE implemented with a reduced lookup table according to some embodiments. Driver 500 includes a feed-forward equalization (FFE) circuit including a symbol buffer 510, a set of lookup tables 520, and an adder circuit 530. Driver 500 also includes a digital-to-analog converter (DAC) 532 and may also include a training circuit such as that shown in FIG. 3. Generally, the FFE circuit receives a plurality of pulse-amplitude modulation (PAM) symbol values to be transmitted at one of multiple PAM levels, and applies a feed-forward equalization filter to produce equalized values to be converted by DAC 532 for transmission. To apply feed-forward equalization, a finite impulse-response (FIR) filter function is implemented the set of multiple lookup tables 520, rather than a single lookup table.

Symbol buffer 510 has an input receiving a series of symbol values, and a series of buffer entries labeled "$S_{K-2}$" . . . "$S_3$", "$S_2$", "$S_1$", "$S_0$", and "$S_{-1}$", which also refer to the symbol values held therein. Similar to symbol buffer 310 described above, symbol buffer 510 is implemented as a shift register holding precursor and postcursor symbol values. In other implementations, more or fewer precursor symbols and postcursor symbols may be used.

The set of lookup tables (LUT's) 520 is used to provide partial FIR values for the FFE process. Set of LUT's 520 includes a number of partial lookup tables 522, 524, 526, . . . , 528, labeled "LUT1", "LUT2", "LUT3", through "LUTK" respectively, to indicate that more partial lookup tables are used depending on the length K of the FIR function implemented by the FFE circuit. Partial LUT 522 has an input connected to buffer entry $S_0$, and an output. Partial LUT 524 has an input connected to buffer entry $S_0$, an input connected to buffer entry $S_{-1}$, and an output. Partial LUT 526 has an input connected to buffer entry $S_0$, an input connected to buffer entry $S_1$, and an output. Partial LUT 526 has an input connected to buffer entry $S_0$, an input connected to buffer entry $S_3$ and an output. Similarly, partial LUT 528 has an input connected to buffer entry $S_0$, an input connected to buffer entry $S_{K-2}$ and an output.

Adder circuit 530 has multiple inputs connected to the respective outputs of partial LUT's 522, 524, 526, and 528, and an output. Adder circuit 530 includes circuitry for adding the partial FIR values from the respective LUTs to produce a value fed to the DAC.

Figure 6:
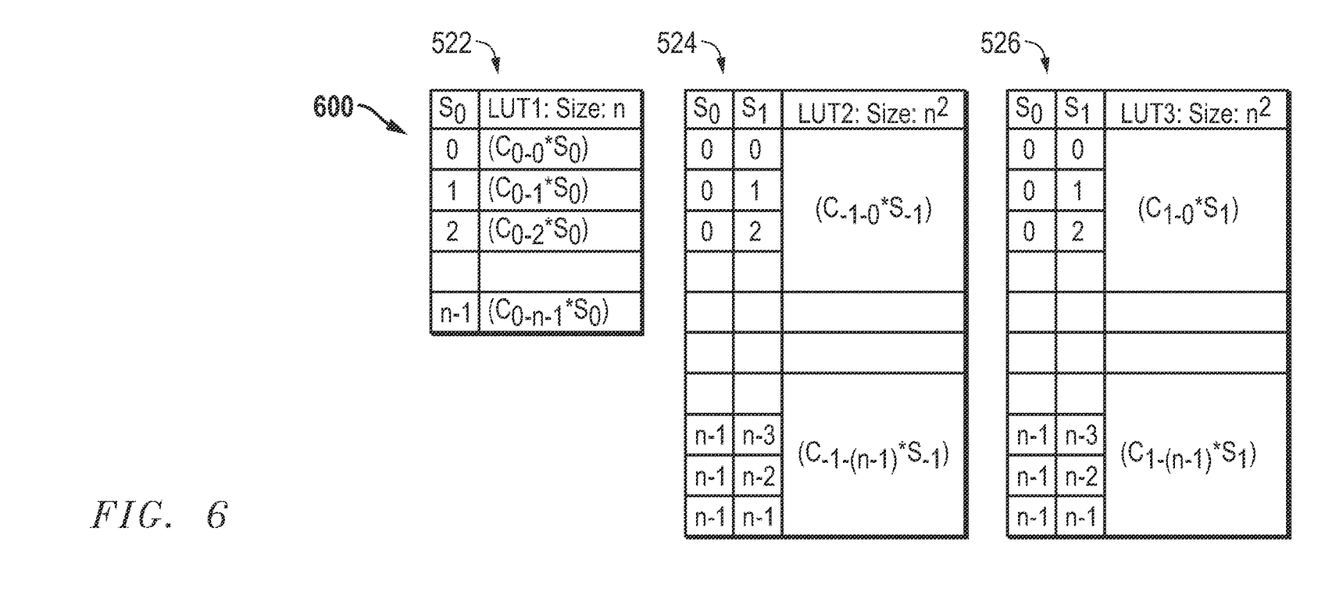
FIG. 6 illustrates a portion of the lookup tables of FIG. 5 for implementing an FFE function of with a reduced LUT according to some embodiments.

FIG. 6 illustrates a portion 600 of the lookup tables of FIG. 5 for implementing an FFE function of with a reduced LUT according to some embodiments. Only three partial LUTs are shown to illustrate how the reduced lookup table is implemented. The remainder of the lookup tables are similar to partial LUTs 524 and 526, indexed using $S_0$ and a respective sample such as $S_2$, $S_3$, etc. Generally, the reduced lookup table implements an FFE function as shown in Equation 3 below:

$$S_0' = [(c_{0-x} * (1 + RLMx) * S_0) + (c_{1-x} * S_1) + (c_{2-x} * S_2) + + (c_{k-x} * S_k)] \quad (3)$$

where "-x" indicates that $c_0$, can be different for each value of main cursor symbol $S_0$, and $c_1$ and $c_2$ can be different for each value of main cursor symbol $S_0$ and the other input symbol, for example $S_{-1}$ for partial LUT 524, and $S_1$ for partial LUT 526.

In this implementation, each weighted symbol value is provided from a separate lookup table. Partial LUT 522 contains partial FIR values and is indexed based on the current PAM symbol value $S_0$, and is sized according to "n", the number of PAM levels in the particular PAM scheme employed. Partial LUT 524 contains partial FIR values and is indexed based on current PAM symbol value $S_0$, and precursor PAM symbol value $S_{-1}$. Partial LUT 526 contains partial FIR values and is indexed based on current PAM symbol value $S_0$ and postcursor PAM symbol value $S_1$. The size of these two-input lookup tables is $n^2$. The remaining partial lookup tables are construed similarly to partial LUT 526. For example, partial LUT 528 contains partial FIR values and is indexed based on postcursor PAM symbol value $S_{K-2}$. As can be understood, depending on the length of symbol buffer 510, further partial LUTs are included between partial LUT 526 and partial LUT 528.

Figure 7:
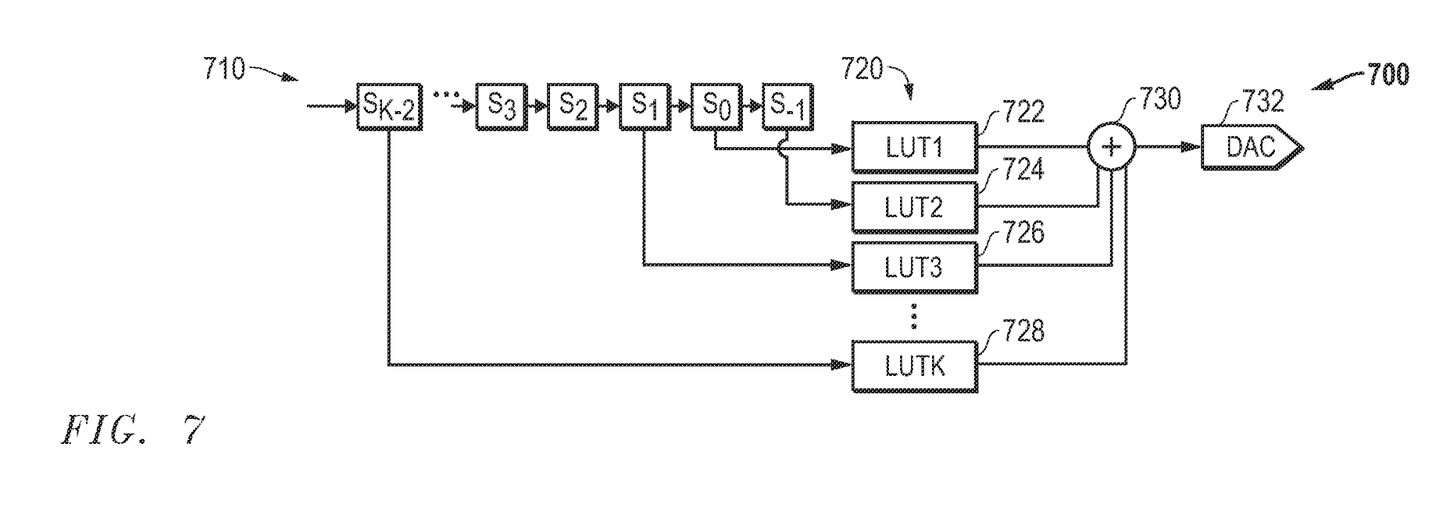
FIG. 7 illustrates in block diagram form a transmit buffer or driver including FFE implemented with a fully reduced lookup table according to some embodiments.

FIG. 7 illustrates in block diagram form a transmit buffer or driver 700 including FFE implemented with a fully reduced lookup table according to some embodiments. Driver 700 includes a feed-forward equalization (FFE) circuit including a symbol buffer 710, a set of lookup tables 720, and an adder circuit 730. Driver 700 also includes a digital-to-analog converter (DAC) 732 and may also include a training circuit such as that shown in FIG. 3. Generally, the FFE circuit receives a plurality of pulse-amplitude modulation (PAM) symbol values to be transmitted at one of multiple PAM levels, and applies a feed-forward equalization filter to produce equalized values to be converted by DAC 732 for transmission. To apply feed-forward equalization, a finite impulse-response (FIR) filter function is implemented the set of multiple lookup tables 720, rather than a single lookup table.

Symbol buffer 710 has an input receiving a series of symbol values, and a series of buffer entries labeled "$S_{K-2}$" ... "$S_3$", "$S_2$", "$S_1$", "$S_0$", and "$S_{-1}$", which also refer to the symbol values held therein. Similar to symbol buffer 310 described above, symbol buffer 710 is implemented as a shift register holding precursor and postcursor symbol values. In other implementations, more or fewer precursor symbols and postcursor symbols may be used.

The set of lookup tables (LUT's) 720 is used to provide partial FIR values for the FFE process in a fully reduced form in which only the single symbol value is used to index each LUT. Set of LUT's 720 includes a number of partial lookup tables 722, 724, 726, ..., 728, labeled "LUT1", "LUT2", "LUT3", through "LUTK" respectively, to indicate that more partial lookup tables are used depending on the length K of the FIR function implemented by the FFE circuit. Partial LUT 722 has an input connected to buffer entry $S_0$, and an output. Partial LUT 724 has an input connected to buffer entry $S_{-1}$, and an output. Partial LUT 726 has an input connected to buffer entry $S_1$, and an output. Partial LUT 726 has an input connected to buffer entry $S_3$ and an output. The remaining partial lookup tables are similarly configured up to partial LUT 728, which has an input connected to buffer entry $S_{K-2}$ and an output.

Adder circuit 730 has multiple inputs connected to the respective outputs of partial LUT's 722, 724, 726, and 728, and an output. Adder circuit 730 includes circuitry for adding the partial FIR values from the respective LUTs to produce a value fed to the DAC.

Figure 8:
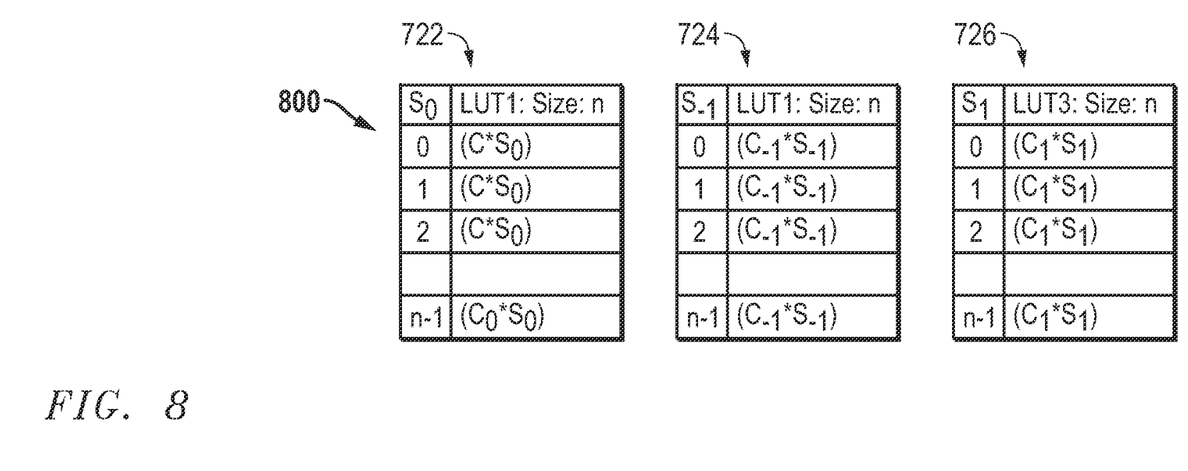
FIG. 8 illustrates a portion of the lookup tables of FIG. 7 for implementing an FFE function of with a reduced LUT according to some embodiments.

FIG. 8 illustrates a portion 800 of the lookup tables of FIG. 7 for implementing an FFE function of with a reduced LUT according to some embodiments. Only three partial LUTs are shown to illustrate how the reduced lookup table is implemented. The remainder of the lookup tables are similar to those shown, indexed with a respective sample value. Generally, the reduced lookup table implements an FFE function as shown in Equation 4 below:

$$S_0' = (c_0 * S_0) + (c_1 * S_1) + (c_2 * S_2) + (c_k * S_k) \quad (4)$$

Each weighted symbol value is provided from a separate lookup table. Each partial lookup table contains partial FIR values and is indexed by a single respective symbol value. The partial lookup tables are sized according to "n", the number of PAM levels in the particular PAM scheme employed. As can be understood, depending on the length of symbol buffer 710, further partial LUTs are included between partial LUT 726 and partial LUT 728.

Figure 9:
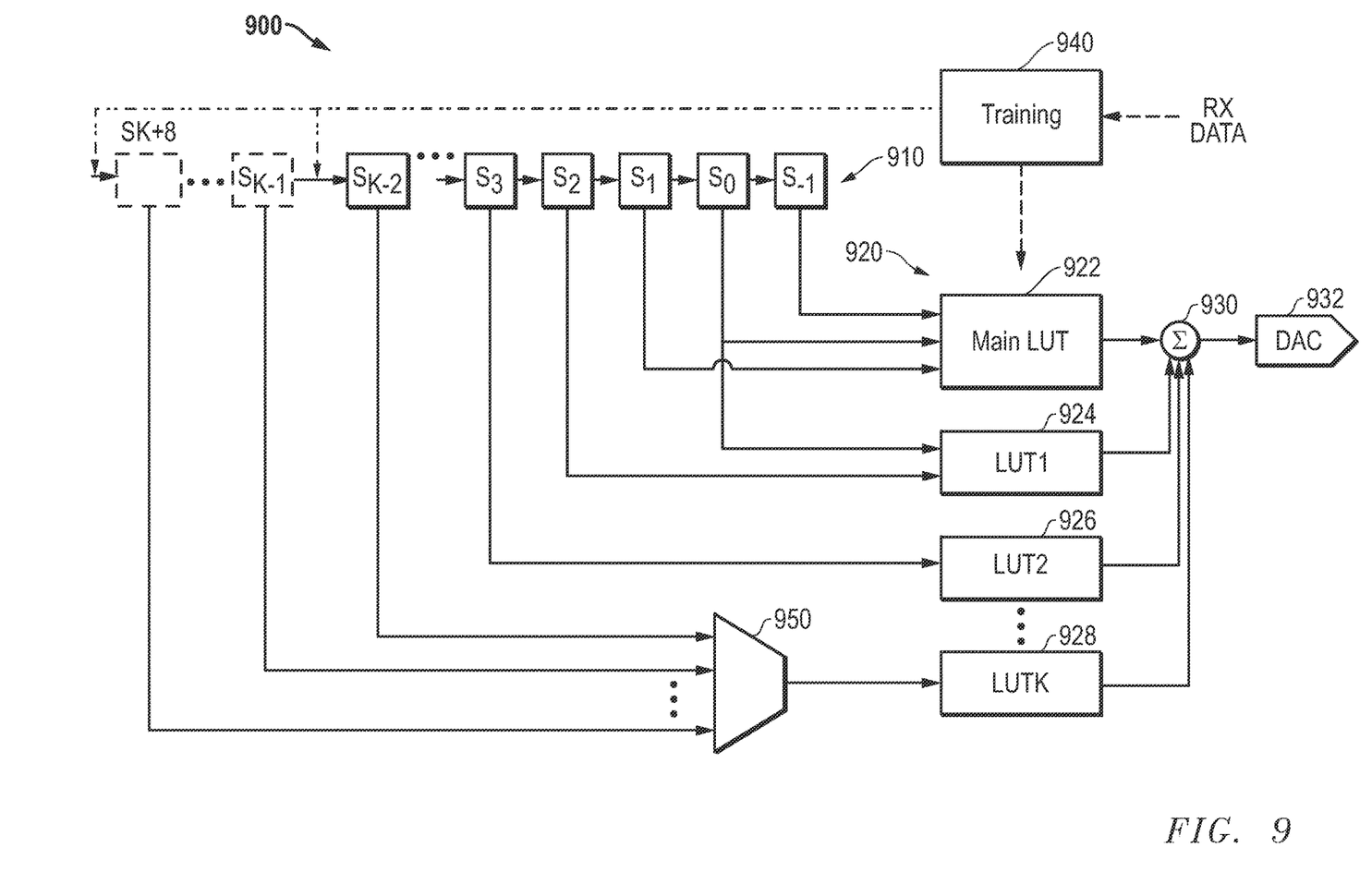
FIG. 9 illustrates in block diagram form a transmit buffer or driver 900 according to some embodiments.

FIG. 9 illustrates in block diagram form a transmit buffer or driver 900 according to some embodiments. Driver 900 is suitable for use as a multi-level PAM driver for a communication link on an integrated circuit, for example in a PHY such as that shown in FIG. 2. Driver 900 includes a feed-forward equalization (FFE) circuit including a symbol buffer 910, a set of lookup tables 920, and an adder circuit 930, and in some embodiments includes a multiplexer 950 for use in implementing a "floating tap" feature as further described below. Driver 900 also includes a digital-to-analog converter (DAC) 932 and a training control circuit 940. The FFE circuit in this embodiment uses a mix of the lookup table types disclosed above, with main LUT 922 implemented as a "full" lookup table like that of FIG. 3, indexed with three symbol values and providing different weights for $c_0$ depending on the three symbol values. LUT 924 is a partially reduced LUT similar to those of FIG. 5, and is indexed with $S_0$ and $S_2$. Finally, LUTs 926 and following are fully reduced lookup tables similar to those of FIG. 7, indexed with a single respective symbol value. In various embodiments, the number of LUTs of each of these three types may be varied in order to adapt the FFE function to adjust to the transfer function of the particular transmission medium to which driver 900 is connected.

Generally, the FFE circuit receives a plurality of pulse-amplitude modulation (PAM) symbol values to be transmitted at one of three or more PAM levels, and applies a feed-forward equalization filter to produce equalized values to be converted by DAC 932 for transmission. To apply feed-forward equalization, a finite impulse-response (FIR) filter function is implemented with a lookup table structure rather than a filter built with delay lines and tap multipliers as in conventional FIR filter circuits.

Symbol buffer 910 has an input receiving a series of symbol values, and a series of buffer entries labeled "$S_{K-2}$" ... "$S_3$", "$S_2$", "$S_1$", "$S_0$", and "$S_{-1}$", and in some embodiments includes an extra series of buffer entries labelled "$S_{K+8}$" ... "$S_{K-1}$", which may be used to implement the "floating tap" feature. Symbol buffer 910 is implemented as a shift register with each buffer entry including an output connected to the next buffer entry and shifted along the buffer at the symbol frequency. Symbol $S_0$ represents the current symbol being processed by the FFE circuit, symbol $S_{-1}$ represents a first precursor symbol (which was previously $S_0$), symbol $S_1$ represents a first postcursor symbol (which will be $S_0$ in the next symbol cycle), with "K" being the size of the filter, and so on.

The set of lookup tables (LUT's) 920 is used to provide partial FIR values for the FFE process. Set of LUT's 920 includes a main lookup table 922 and additional partial LUT's 924, 926, and 928, labeled "LUT1", "LUT2" and "LUTK", respectively, to indicate that more partial lookup tables are used depending on the length of the FIR function implemented by the FFE circuit. Main LUT 922 has an input connected to buffer entry $S_0$, an input connected to buffer entry $S_1$, an input connected to buffer entry $S_{-1}$, and an output. Main LUT 922 contains partial FIR values and is indexed based on the current PAM symbol value $S_0$, precursor PAM symbol value $S_{-1}$, and a postcursor PAM symbol value $S_0$. While in this embodiments, the Main LUT is indexed with three symbol values, in other embodiments more symbol values may be used, including arrangements with two or more precursor symbol values and two or more postcursor symbol values.

Partial LUT 924 has an input connected to buffer entry $S_0$, an input connected to buffer entry $S_2$, and an output. Partial LUT 924 contains partial FIR values and is indexed based on current PAM symbol value $S_0$, and postcursor PAM symbol value $S_2$. Partial LUT 926 has an input connected to buffer entry $S_3$ and an output. Partial LUT 926 contains partial FIR values and is indexed based on postcursor PAM symbol value $S_2$. Multiplexer 940 has an input connected to buffer entry $S_{K-2}$, and a number of entries each connected to buffer enteries $S_{K+8}$". . . $S_{K-1}$, respectively. Multiplexer 940 also has a selection input (not shown) for selecting which input symbol value to pass to the input of partial LUT 928. Partial LUT 928 has an input connected to the output of multiplexer 940 for implementing the "floating tap" feature, and an output. Partial LUT 928 contains partial FIR values and is indexed based on postcursor PAM symbol that is passed to it from multiplexer 940. As can be understood, depending on the length of symbol buffer 910, further partial LUTs are included between partial LUT 926 and partial LUT 928.

Adder circuit 930 has multiple inputs connected to the respective outputs of main LUT 922 and partial LUT's 924, 926, and 928, and an output. Adder circuit 930 includes circuitry for adding the partial FIR values from the respective LUTs to produce a value fed to the DAC.

Training control circuit 940 is operable to train tap weights for main LUT 922 independently of training tap weights for the additional partial LUT's 924, 926, and 928. Training control circuit 940 has an input for receiving data back from a receiver during a training mode, labeled "RX DATA", an output for feeding data to the input of symbol buffer 910 during a training mode, and connection to the set of lookup tables 920 for adjusting weights during a training mode. During training, the floating tap feature may be programmed to select buffer entry $S_{K-2}$ or one of the other buffer entries, if it is found that a particular postcursor symbol has a large effect on the accuracy during training. While in this embodiment, postcursor symbols are used for the floating tap feature, in other embodiments precursor symbols may instead be used. For example, a series of precursor symbols before $S_{-1}$ may be fed to a multiplexer to select one symbol to use as input to a partial lookup table. Two such floating tap circuits may also be used, one for precursor symbols and one for postcursor symbols.

In operation, main LUT 922 provides partial FIR values calculated with different tap weights depending on the current PAM symbol value $S_0$, the precursor PAM symbol value $S_1$, and the postcursor PAM symbol value $S_1$. In this embodiment, partial LUT 924 is also indexed based on the postcursor PAM symbol value $S_2$ and current PAM symbol value $S_0$ and provides partial FIR values calculated with different tap weights depending on the current PAM symbol value $S_0$. In other embodiments, more than one of the partial LUTs may be constructed in the same way as partial LUT 924, using both symbol value $S_0$ and another symbol value to look up partial FIR values. Partial LUT 926 is indexed only based on postcursor PAM symbol value $S_3$. Partial LUT 928 is based on postcursor PAM symbol value $S_{K-2}$. In some embodiments, the final partial LUT, that is partial LUT 928, is also indexed based on current PAM symbol value $S_0$.

In some embodiments, main LUT 922 provides partial FIR values each having a longer bit length than those of the one or more additional partial LUTs. The additional precision is used to provide a greater variation in values associated with larger weights typically present for symbols $S_1$, $S_0$, and $S_{-1}$. For example, main LUT 922 may provide 6-bit values, while partial LUT's 924, 926, and 928 provide 5-bit values. In some embodiments, the bit length is the same for all the LUT's.

The use of multiple partial lookup tables in lookup tables 920 improves the flexibility for training the filter coefficients (weights) as well as computing and storing them. The symbols with the highest value coefficients are the ones that typically interact with one another during training. As further discussed below, using multiple LUTs as described herein allows coefficients for these symbols to be grouped together into one LUT, as are symbols $S_1$, $S_0$ and $S_{-1}$ in this embodiment. A LUT with coefficients for just these three symbols for a PAMx system will just require an LUT of size $x^9$ (for example 4 9=64 for PAM4). Higher order filter taps for symbols with smaller coefficients ($S_2$, $S_3$ . . . ) may each have a LUT that is indexed only by $S_0$ and the symbol itself. Such a scheme employs LUT's each of size $x^2$, allowing a different FFE function to be implemented for each value for $S_0$, without being expensive in area, power or circuit complexity. Even higher order filter taps, which typically have very small weights in comparison to the lower order taps, can be assumed linear and use only a $x^1$ LUT indexed by the sample value itself.

For a PAM4 system with ten FFE coefficients and 16-bit parallel data, a flat LUT based system will require 16 k bits. Training, or pre-computing, the contents of these 16 k bits is also very intensive for training time. A traditional FIR based approach will require 16 multiply-accumulators (MAC's), each capable of multiplying and adding 10 numbers. If the same system were to be implemented in the proposed scheme with 1 LUT for the three largest coefficient, one LUT each for coefficients 4-7 indexed with $S_0$ and $S_{K-2}$ and one LUT each for coefficients 8-10 indexed with $S_{K-2}$ only, it would require no multipliers, only adders, and LUTs of total size=1×4 9+4×4 2+9×4=140 bits. The techniques herein therefore provide improvements over both lookup table and traditional filter solutions in terms of total flop count, area and power.

Thus, as can be understood based on the above description, a method, circuit, and integrated circuit have been described including a reduced and partial LUT implementation of an FFE process is provided having advantages over both an FIR filter-based process and a full LUT based implementations, in terms of memory usage, complexity, power, and training simplicity.

A data processing system or portions thereof described herein can be embodied one or more integrated circuits, any of which may be described or represented by a computer accessible data structure in the form of a database or other data structure which can be read by a program and used, directly or indirectly, to fabricate integrated circuits. For example, this data structure may be a behavioral-level description or register-transfer level (RTL) description of the hardware functionality in a high-level design language (HDL) such as Verilog or VHDL. The description may be read by a synthesis tool which may synthesize the description to produce a netlist including a list of gates from a synthesis library. The netlist includes a set of gates that also represent the functionality of the hardware including integrated circuits. The netlist may then be placed and routed to produce a data set describing geometric shapes to be applied to masks. The masks may then be used in various semiconductor fabrication steps to produce the integrated circuits. Alternatively, the database on the computer accessible storage medium may be the netlist (with or without the synthesis library) or the data set, as desired, or Graphic Data System (GDS) II data.

While particular embodiments have been described, various modifications to these embodiments will be apparent to those skilled in the art. For example, the embodiments have been described with reference to high speed data links for memory applications, however other forms of data links may also benefit from the techniques described herein Accordingly, it is intended by the appended claims to cover all modifications of the disclosed embodiments that fall within the scope of the disclosed embodiments.

What is claimed is:

1. A driver circuit for a transmission link comprising:
a feed-forward equalization (FFE) circuit receiving a plurality of pulse-amplitude modulation (PAM) symbol values to be transmitted at one of multiple PAM levels, the FFE circuit comprising:
a first partial lookup table containing partial finite impulse-response (FIR) values and indexed based on a current PAM symbol value, a precursor PAM symbol value, and a postcursor PAM symbol value;
one or more additional partial lookup tables each containing partial FIR values and indexed based on a respective additional one or more of the PAM symbol values; and
an adder circuit adding results of lookups from the first partial lookup table and the additional partial lookup tables to produce an output value.

2. The driver circuit of claim 1, wherein:
the first partial lookup table provides partial FIR values calculated with different tap weights depending on the current PAM symbol value.

3. The driver circuit of claim 2, wherein:
the first partial lookup table provides the partial FIR values calculated with different tap weights depending on the current PAM symbol value, the precursor PAM symbol value, and the postcursor PAM symbol value.

4. The driver circuit of claim 2, wherein:
some of the one or more additional partial lookup tables are also indexed based on the current PAM symbol value and provide the partial FIR values calculated with different tap weights depending on the current PAM symbol value.

5. The driver circuit of claim 1, wherein:
the first partial lookup table provides the partial FIR values each having a longer bit length than those of the one or more additional partial lookup tables.

6. The driver circuit of claim 1, further comprising:
a training control circuit operable to train tap weights for the first partial lookup table independently of training tap weights for the one or more additional partial lookup tables.

7. The driver circuit of claim 1, wherein:
there are multiple additional PAM symbol values; and
the driver circuit further comprises a multiplexer with a plurality of inputs receiving respective selected ones of the additional one more PAM symbol values and an output connected to one of the one or more additional partial lookup tables.

8. A method of producing a pulse-amplitude modulated (PAM) signal, comprising:
receiving a plurality of PAM symbol values to be transmitted at one of multiple PAM levels;
based on a current PAM symbol value, a precursor PAM symbol value, and a postcursor PAM symbol value of the plurality PAM symbol values, looking up a partial finite impulse-response (FIR) value in a first partial lookup table;
looking up one or more additional partial FIR values in one or more additional partial lookup tables based on one or more additional PAM symbol values of the plurality of PAM symbol values; and
adding results of lookups from the first partial lookup table and the additional partial lookup tables to produce a feed-forward equalized value.

9. The method of claim 8, wherein:
looking up one or more additional partial FIR values in one or more additional partial lookup tables comprises providing partial FIR values calculated with different tap weights depending on the current PAM symbol value.

10. The method of claim 9, wherein:
looking up based on one or more additional PAM symbol values of the plurality of PAM symbol values comprises providing the partial FIR values calculated with different tap weights depending on the current PAM symbol value, the precursor PAM symbol value, and the postcursor PAM symbol value.

11. The method of claim 9, wherein:
looking up based on one or more additional PAM symbol values of the plurality of PAM symbol values comprises indexing at least some of the one or more additional partial lookup tables based on the current PAM symbol value and provide the one or more additional partial FIR values calculated with different tap weights depending on the current PAM symbol value.

12. The method of claim 8, wherein:
looking up based on one or more additional PAM symbol values of the plurality of PAM symbol values comprises providing partial FIR values having a longer bit length those of the one or more additional partial lookup tables.

13. The method of claim 8, further comprising:
training tap weights for the first partial lookup table independently of training tap weights for the one or more additional partial lookup tables.

14. A data processing system comprising:
a data processor embodied on an integrated circuit (IC);
a physical layer circuit (PHY) embodied in the IC and comprising at least one driver circuit for transmitting accesses generated by the data processor over a communication link, the at least one driver circuit comprising:
a feed-forward equalization (FFE) circuit receiving a plurality of pulse-amplitude modulation (PAM) symbol values to be transmitted at one of multiple PAM levels, the FFE circuit comprising:
a first partial lookup table containing partial finite impulse-response (FIR) values and indexed based on a current PAM symbol value, a precursor PAM symbol value, and a postcursor PAM symbol value;
one or more additional partial lookup tables each containing partial FIR values and indexed based on a respective additional one or more of the PAM symbol values; and
an adder circuit adding results of lookups from the first partial lookup table and the additional partial lookup tables to produce an output value.

15. The data processing system of claim 14, wherein:
the first partial lookup table provides the partial FIR values calculated with different tap weights depending on the current PAM symbol value.

16. The data processing system of claim 15, wherein:
the first partial lookup table provides the partial FIR values calculated with different tap weights depending on the current PAM symbol value, the precursor PAM symbol value, and the postcursor PAM symbol value.

17. The data processing system of claim 15, wherein:
some of the one or more additional partial lookup tables are also indexed based on the current PAM symbol value and provide the partial FIR values calculated with different tap weights depending on the current PAM symbol value.

18. The data processing system of claim 14, wherein:
the first partial lookup table provides the partial FIR values each having a longer bit length than those of the one or more additional partial lookup tables.

19. The data processing system of claim 14, further comprising:
a training control circuit operable to train tap weights for the first partial lookup table independently of training tap weights for the one or more additional partial lookup tables.

20. The data processing system of claim 14, wherein:
there are multiple additional PAM symbol values; and
the driver circuit further comprises a multiplexer with a plurality of inputs receiving respective selected ones of the additional one more PAM symbol values and an output connected to one of the one or more additional partial lookup tables.

* * * * *